Feb. 28, 1933.  H. L. TRUMBULL  1,899,067
METHOD OF MAKING SPLICED RUBBER SHEETS
Filed June 30, 1927
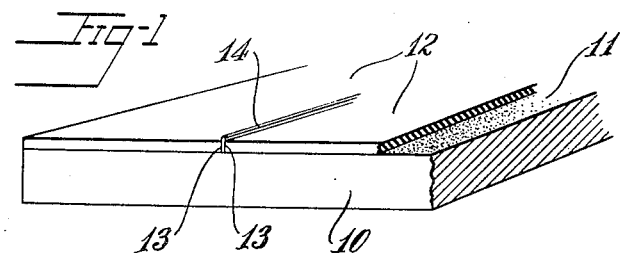
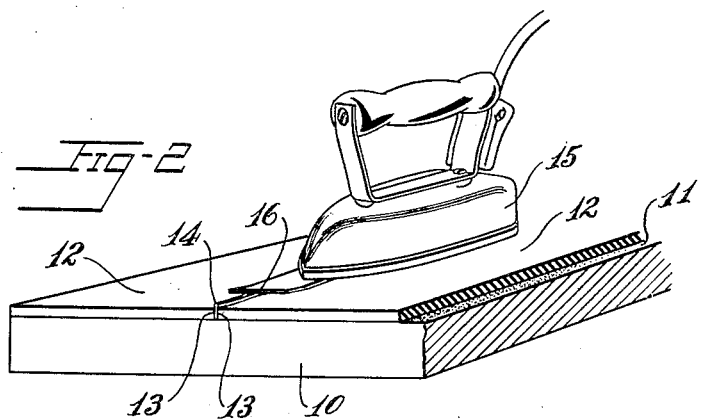
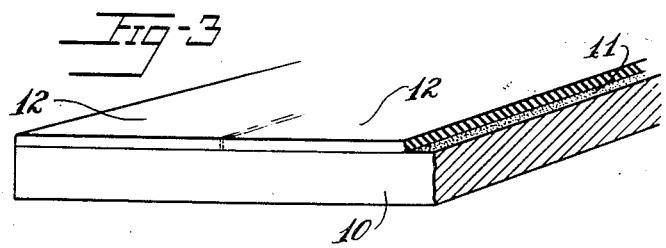
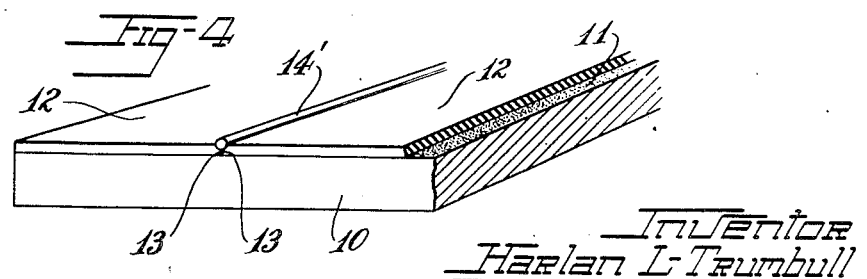

Patented Feb. 28, 1933

1,899,067

UNITED STATES PATENT OFFICE

HARLAN L. TRUMBULL, OF HUDSON, OHIO, ASSIGNOR TO THE B. F. GOODRICH COMPANY, OF NEW YORK, N. Y., A CORPORATION OF NEW YORK

METHOD OF MAKING SPLICED RUBBER SHEETS

Application filed June 30, 1927. Serial No. 202,757.

This invention relates to the splicing of rubber sheets and particularly to means for securing a strong and impervious butt splice between thin sheets of rubber, such as between the relatively thin sheets of rubber employed in covering various articles, as in lining metal or wooden tanks, etc., and to quick and economical methods of producing such a butt splice.

It has been the practice heretofore in lining tanks, and particularly large tanks, with sheet rubber to form lap seams, utilizing a vulcanizable rubber stock which will cure at low temperatures, or a two ply stock having a vulcanized backing and a vulcanizable facing, so that in either case the rubber may be vulcanized in place by a fluid medium at relatively low temperatures. The overlapping of the rubber sheets increases the thickness of the lining locally at the seams, each of which presents an edge protruding from the normal surface of the lining which is likely to be pulled loose under severe service, opening up the same.

The purpose of the present invention is to provide a clean smooth butt joint between contiguous sheets of rubber used as a lining for tanks or as a covering for any article which it is desired to cover with rubber, or, if desired, between two sheets of rubber which are not designed for use either as a lining or cover of an article. The invention is described herein for convenience in connection with the application of a covering or lining to an article, but where the rubber sheet is not to be united to an article, the splicing operation may be performed on any suitable support or table.

In carrying out this invention, the rubber is applied to a backing material, or to a table, with the edges of the rubber in abutting relation, and a thin sheet of a tacky rubber isomer is placed edgewise between the rubber sheets so as to be compressed therebetween, the rubber isomer sheet being preferably of sufficient width to project to a small distance from the surface of the rubber sheets. Heat and pressure are now applied to the seam by any suitable means in such way that the rubber isomer is fluxed between the rubber sheets, in which condition it strongly adheres to the rubber and forms an impervious butt-spliced seam.

Referring to the accompanying drawing for a more detailed description of my invention, Fig. 1 is a fragmentary view in elevation and in perspective of two rubber sheets butt spliced in accordance with the present invention; Fig. 2 is a similar view showing a method of forming the same; Fig. 3 is a similar view showing the rubber sheets with the finished butt-spliced seam; and Fig. 4 is a view similar to Fig. 1 of a modified form of sealing strip.

In the embodiment of the invention illustrated in the drawing, I show a backing material 10 formed of wood, metal or other suitable material, to which is secured, as by suitable binding material 11, the rubber sheets 12 which have contiguous edges 13 in abutting relation to each other. A thin sheet 14 of tacky rubber isomer is inserted edgewise between the edges 13 preferably at the time of applying the rubber sheets 12 and in such manner that it protrudes somewhat from the surfaces of the rubber sheets 12. The extent of the protusion should not be great and may be determined by the width of the sheet of the inserted rubber isomer or the rubber isomer sheet may be trimmed after insertion to the required width. Alternatively, I may lay into or upon the seam at the abutting edges 13 of the sheets 12, threads or strips 14′ of the rubber isomer, as shown in Fig. 4. Furthermore, in practice, I find it desirable to blend, as by admixture on a rubber mill, the rubber isomer with raw rubber in proportions of 10 to 100 parts by weight of rubber to 100 parts of the rubber isomer, since the blended product may be calendered into thin sheets or extruded into threads or strips more readily and handled with greater facility. In certain cases I also find it to be desirable to admix with the rubber isomer, or the rubber blended rubber isomer, pigments, softeners, and vulcanizing agents of the character employed in rubber compounding.

In welding the rubber isomer 14 into the seam between the edges 13, any suitable instrument for heating and pressing the rubber sheets at the seam may be employed. In Fig. 2, I have shown an electric iron 15 and a strip of any suitable material 16 interposed between the iron 15 and the seam. The iron is run along the seam with sufficient pressure to flow the rubber isomer 14 into the seam and flush with the rubber sheets, the rubber isomer fluxing under the heat of the iron and firmly adhering to the rubber sheets to form an impervious joint therebetween. The strip 16 merely serves to prevent the displacement of the rubber isomer as the iron is moved in pressure contact thereover. It is obvious that a heated roller may be used in place of the iron, in which case the strip 16 would not be essential.

The hereinabove described operation gives a strong bond between the two sheets of rubber and effectually seals the joint therebetween so that it is impervious to liquids and gases. Moreover, the seam is perfectly flat and consequently does not offer a projecting edge as does a lap joint.

The construction herein described is useful in covering with sheet rubber shafts, propellers and other objects which it is desired to protect from the influence of corrosive fluids or from the abrasive action of solids, such as sand, grit and the like, and the method may be employed in connection with backing materials of all kinds, whether rigid or flexible, and may be employed to advantage when the rubber sheet is to be employed without any other material associated therewith.

The rubber isomers which have been found to be most effective for employment in this invention are of the type referred to as the tough, tacky, heat-plastic rubber derivatives in the patent to Harry L. Fisher, No. 1,605,180 of November 2, 1926. It is to be understood, however, that other heat plastic rubber isomers than those described in the aforesaid Fisher patent may be employed in carrying out the invention hereof and it is the intension that the term "rubber isomer" as employed in this application shall include all tacky, heat-plastic solid derivatives of rubber comprising as a main constituent a substance having the same carbon-hydrogen ratio as rubber, however they may be prepared, and whether in a pure or impure state, or whether or not admixed with other ingredients.

It will be understood that numerous modifications and variations may be made in the process and product hereinabove described without departing from the spirit of this invention and I therefore do not purpose to limit the claims hereof otherwise than necessitated by the prior art.

I claim:

1. The method of butt splicing rubber sheets which comprises square-cutting the abutting edges of the sheets, placing the sheets with abutting edges contiguous, interposing between the contiguous edges a material comprising a rubber insomer, and subjecting the rubber isomer material and the rubber sheets at the contiguous edges to heat and pressure.

2. The process of butt-splicing rubber sheets which comprises placing a substantially square-formed edge of one sheet in contiguous position to a substantially square-formed edge of another sheet, interposing a thin sheet comprising a rubber isomer edgewise between the contiguous square-formed edges, and subjecting the strip and the rubber sheets at the contiguous edges to heat and pressure.

3. The method of covering a backing material with sheets of rubber which comprises square cutting the abutting edges of the sheets, fitting the rubber sheets to the backing material in abutted contiguous relation, interposing between the contiguous edges of said rubber sheets a strip of material comprising a rubber isomer, and subjecting the strip and the rubber sheets at the contiguous edges to heat and pressure.

4. The method of covering a backing material with sheet rubber material which comprises square-cutting the edges of the sheet rubber material, cementing the sheet rubber to the backing employed so as to completely cover the backing material with the rubber, the seams being formed by abutting of the sheet rubber material, interposing a strip comprising a rubber isomer between the abutting edges of the sheet rubber, and subjecting the strip and the abutting portions of the rubber sheet to heat and pressure.

5. The method of square butt-splicing thin rubber sheets which comprises placing the sheets contiguous one to the other with abutting edges so formed that the plane of interfacial contact of the abutting edges is substantially normal to the extended surfaces of the sheets, and forcing a normally solid resilient material comprising a rubber isomer while in a heated flowable condition into pressure contact with the contiguous edges of the rubber sheets.

6. The method of butt-splicing thin rubber sheets which comprises placing the sheets contiguous one to the other with abutting edges so formed that the plane of interfacial contact of the abutting edges is substantially normal to the extended surfaces of the sheets, interposing at the abutting edges a material comprising a rubber isomer and flowing the rubber isomer material into pressure contact with the contiguous abutting edges of the rubber sheets by heat and pressure applied to the rubber isomer material and to the rubber sheets in the region of their abutting edges.

7. The method of covering an article with a thin rubber covering of substantially uniform thickness which comprises fitting thin sheets of rubber to the article with abutting edges so formed that the plane of interfacial contact of the abutting edges is substantially normal to the surface of the article being covered, and forcing a normally solid material comprising a rubber isomer while in a heated flowable condition into pressure contact with the abutting edges of the thin rubber sheets by the application of heat and pressure to the rubber isomer material and to the rubber sheets in the region of their abutting edges.

8. The method of covering an article with a thin rubber covering of substantially uniform thickness which comprises fitting thin sheets of rubber to the article with abutting edges so formed that the plane of interfacial contact of the abutting edges is substantially normal to the surface of the article being covered, interposing at the abutting edges a material comprising a rubber isomer, and forcing the material comprising the rubber isomer while in a heated flowable condition into pressure contact with the abutting edges of the thin rubber sheets by the application of heat and pressure to the rubber isomer material and to the rubber sheets in the region of their abutting edges.

In witness whereof I have hereunto set my hand this 27th day of June, 1927.

HARLAN L. TRUMBULL.